Patented Feb. 12, 1946

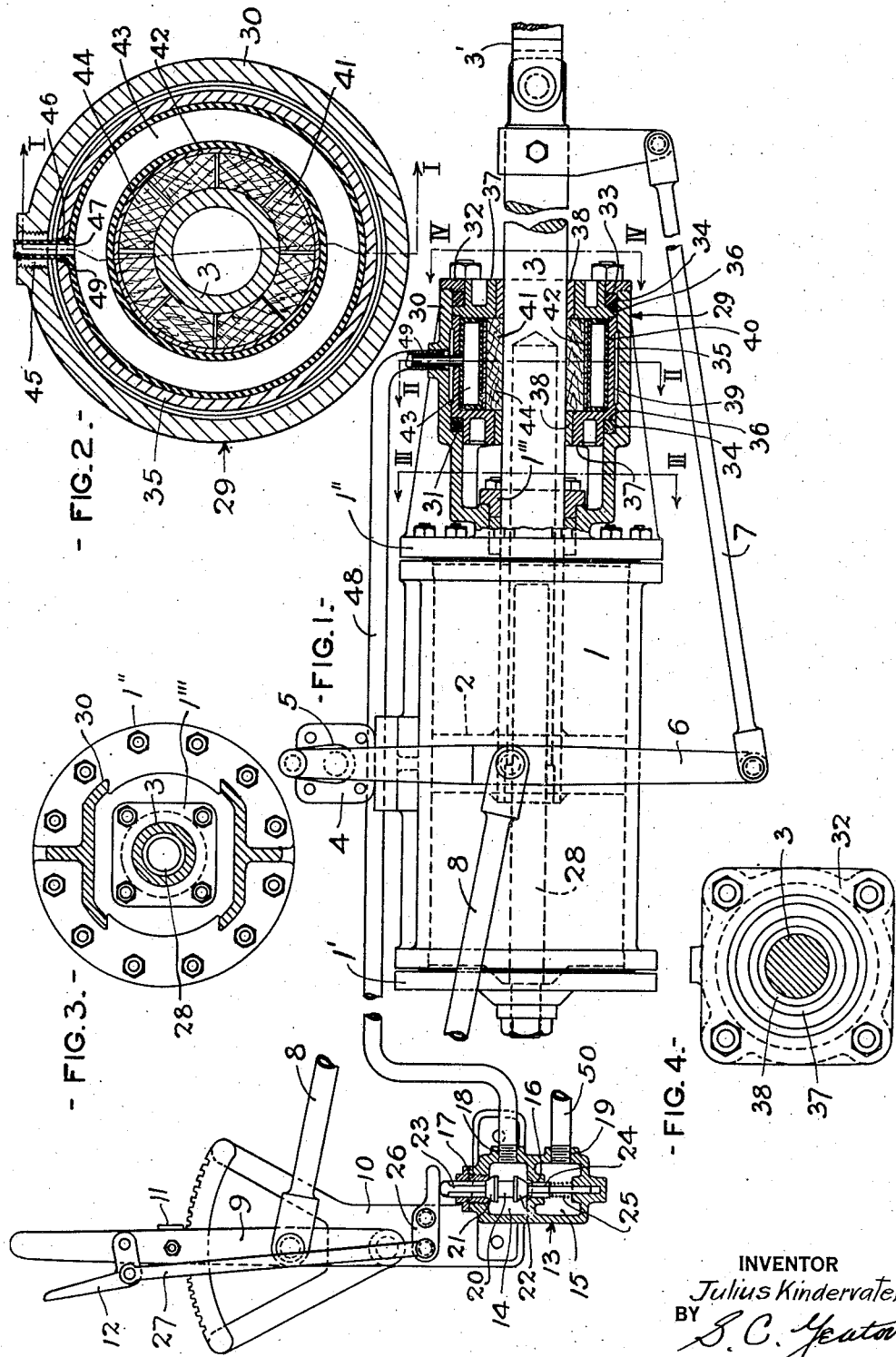

2,394,785

UNITED STATES PATENT OFFICE 2,394,785

BRAKE FOR POWER REVERSE GEARS

Julius Kindervater, Richmond, Va., assignor to American Locomotive Company, New York, N. Y., a corporation of New York Application May 4, 1944, Serial No. 534,177

4 Claims. (Cl. 188—151)

This invention relates to a brake for shafts and is especially adapted for a power reverse gear for a steam locomotive and more particularly to an automatic brake for the piston rod of the gear.

An object of the present invention is to provide a brake as aforesaid having a power fluid controlled member contractable to effect gripping of the shaft.

Other and further objects of this invention will appear from the following description, the accompanying drawing and the appended claims.

The brake of the present invention is especially adapted for braking the reciprocating rods of a power reverse gear which are considered comparable with reciprocating shafts, as for instance the piston rod or reach rod of the reverse gear. Therefore, to illustrate the adaptability of the present invention it will be considered hereafter in connection with the power reverse gear.

Referring to the drawing forming a part of this application, Figure 1 is a foreshortened side elevation of a power reverse gear embodying the present invention, parts being shown in vertical central section and other parts being shown in section on the line I—I of Fig. 2; Fig. 2 is an enlarged section on the line II—II of Fig. 1; Fig. 3 is a section on the line III—III of Fig. 1; and Fig. 4 is a section on the line IV—IV of Fig. 1.

Referring to Fig. 1 of the drawing, the power reverse gear has a cylinder 1 in which is disposed a reciprocable piston 2 having a cylindrical piston rod 3 which extends through one end of the cylinder and, in practice, is connected at its outer end to the reach rod 3' of the distribution valve gear (not shown) in the usual manner. A valve 4 for controlling the flow of power fluid to and from the cylinder is mounted on top of the cylinder. The valve has a valve element 5 pivotally connected to the top of a floating lever 6 which is pivotally connected at its bottom to one end of a link 7. The link is pivotally connected at its other end to the piston rod 3.

An operating rod 8 is pivotally connected at one end to the central portion of the lever 6 and at its other end to a reverse lever 9. The lever 9 is pivotally connected to a notched quadrant member 10, and a latch 11, operated by a handle 12 pivotally connected to the lever 9, is provided for engaging the notches for holding the lever 9 in desired adjusted positions for adjustment of the piston 2.

The power reverse gear as thus far described is conventional and no further description thereof is deemed necessary. Only sufficient of the gear is shown to render an understanding of the present invention.

A valve 13 is mounted on the quadrant member 10. It has a top chamber 14 and a bottom chamber 15 connected by a passage 16. The top chamber has an exhaust port 17 opening through the top and an outlet port 18 opening through the side. The bottom chamber has an inlet port 19 opening through the side. A double-acting valve element 20 having a head 21 for controlling port 17 and a head 22 for controlling passage 16 is disposed in the top chamber, the heads 21 and 22 being arranged so that only one can seat at a time. Element 20 further has a fluted stem 23 extending through and beyond port 17 and a fluted stem 24 extending through and beyond passage 16. A spring 25 in chamber 15 exerts a force on the valve element urging it upward.

A rocker 26 is fulcrumed to the quadrant member 10 just above the valve 13. One end of the rocker 26 is pivotally connected to the lower end of a link 27, the upper end of which is pivotally connected to handle 12 at a point thereon spaced from the pivotal connection between the handle 12 and the lever 9. The other end of the rocker overlies and engages the stem 23 of the valve element 20.

Piston rod 3 is hollow at the end portion adjacent the piston, and a rod 28 is telescoped at one end therein and secured at its other end to the head 1' of the cylinder remote from the piston rod, the rod 28 thereby supporting the piston.

The brake of the present invention is indicated generally by the reference numeral 29 and, as aforesaid, is well adapted for association with a reciprocable rod of the distribution valve control mechanism that is operatively connected to the piston 2 for longitudinal movement therewith, as for instance the piston rod 3 or the reach rod 3'. In the present instance the brake 29 is associated with the piston rod 3 exteriorly of the cylinder 1 as this will, in most instances, be found preferable. The brake is for gripping the rod and holding the piston in any desired adjusted cutoff position of the distribution valve of the engine (not shown).

The brake has a cylindrical head or housing 30 cast integral with the adjacent head 1" of the cylinder and surrounding the gland 1''' of the piston rod. Head 1" is bolted to the cylinder. Toward its inner end the housing 30 is provided with an internal shoulder 31. At the other side a ring or gland 32 is bolted to the housing forming another internal shoulder 33. A resilient shock-absorbing ring 34, which may be made of rubber or other resilient material, is disposed adjacent each shoulder. A floating cylindrical casing 35 is disposed in the housing in close fit therewith at portions thereof adjacent the rings 34 so that no relative radial movements between the housing and casing occur, and this casing is provided with abutments 36 engaging the rings 34, and annular portions or bosses 37 extending through the rings 34 for holding them in place. The bosses 37 also closely fit portions of the housing 30. Bushings 38, fitting the rod 3 with a sliding fit, are disposed in the bosses 37. Casing 35 is made in two pieces, one piece including the inner of the bosses 37, an adjacent abutment 36 and a cylindrical portion 39 extending therefrom to the other piece of casing 35, which other piece includes only the outer boss 37 and the other abutment 36. The cylindrical portion 39 provides an annular space 40 between it and the piston rod 3, this space having side walls formed by the inner faces of the abutments 36 and bosses 37, all as is clearly shown in Fig. 1.

A segmental ring 41 is disposed in space 40 surrounding and engaging the rod 3, but not fully occupying space 40. A thin resilient ring 42 surrounds and is secured to the ring 41 and an annular hollow resilient tube 43 surrounds ring 42 and fills the remainder of the space 40.

Ring 41 is formed of eight segments 44 which are slightly spaced from each other so that they will grip the rod 3 when gripping pressure is applied. The segments may be made of wood or fibre or any other suitable material.

Tube 43 resembles an automobile tire inner tube and may be made of rubber or other suitable material.

The housing 30, casing cylindrical portion 39, and the outer circumferential wall of tube 43 are provided with aligned orifices 45, 46 and 47, respectively. A pipe 48 connects orifice 45 with port 18. A short nipple 49 is secured in orifice 47 and extends through orifices 46 and 45 into the adjacent end of pipe 48.

A pipe 50 connects port 19 with a source of power fluid supply (not shown). It is conventional practice to employ an elastic fluid such as compressed air from an air reservoir to operate the piston 2 and in such case pipe 50 may be connected to the same reservoir and air employed to actuate the brake 29.

The operation of the reverse gear and brake is as follows:

The gear is shown in the drawing in neutral or zero cut-off position. In order to start the locomotive, the engineer first grips the handle 12 and moves it toward the lever 9. This lifts the latch 11 out of engagement with the notches of the quadrant and at the same time lifts link 27 and pivots rocker 26, pushing valve element 20 downward, compressing spring 25, opening port 17 and closing passage 16. The pressure of the air, or other fluid, in tube 43 is thereby released by exhaust through port 17, deflating tube 43 and releasing the segments 44 from their gripping of the rod 3.

The engineer then moves lever 9 to the desired cut-off position, retaining his grip on handle 12 until piston 2 is moved by air to its proper position in a conventional manner, to set the distribution valve gear (not shown) to the desired cut-off position, no further description of this part of the operation of the reverse gear being therefore deemed necessary.

When piston 2 has reached its proper position, the engineer releases his grip on handle 12, whereby latch 11 locks with the proper notch of the quadrant, and rocker 26 releases valve element 20. Spring 25 then reacts, pushing valve element 20 upward, closing port 17 and opening passage 16.

Air or other fluid from pipe 50 then flows into chamber 15, through passage 16 into chamber 14 and through pipe 48 to tube 43. Tube 43 is thereby inflated, pressing the segments 44 into gripping engagement with the rod 3 and holding the piston against any movement from its proper adjusted position. By so holding the piston rod, the piston is prevented from creeping, which is a well-known undesirable possibility of reverse gear pistons.

The shock-absorbing rings 34 cushion any axial thrusts that the distribution valve gear may exert on the brake when the brake is gripping.

Rod 28, besides supporting the piston, also partially reduces the working area on the left side (Fig. 1) of the piston so that it more nearly balances the working area on the right side of the piston.

While there has been hereinbefore described an approved embodiment of the invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A brake for a reciprocable shaft comprising a segmental ring adapted to surround said shaft, with the segments of said ring having clearance therebetween, cushioning means for absorbing axial shocks applied to said ring, a flexible hollow ring-like member surrounding said segmental ring about the exterior circumferential face thereof, and controllable means for providing said member with, and relieving said member of, a power fluid for respectively inflating said member to contract said ring to force said segments to grip said shaft, and deflating said member to expand said ring to release said segments from said grip.

2. A brake for a reciprocable shaft comprising a segmental ring adapted to surround said shaft, with the segments of said ring having clearance therebetween, cushioning means for absorbing axial shocks applied to said ring, a flexible hollow ring-like member surrounding said segmental ring about the exterior circumferential face thereof, a rigid backing for said member, and controllable means for providing said member with, and relieving said member of, a power fluid for respectively inflating said member to contract said ring to force said segments to grip said shaft, and deflating said member to expand said ring to release said segments from said grip.

3. A brake for a reciprocable shaft comprising a segmental ring adapted to surround said shaft, with the segments of said ring having clearance therebetween, cushioning means for absorbing axial shocks applied to said ring, a flexible hollow ring-like member surrounding said segmental ring about the exterior circumferential face thereof, a housing supporting said cushioning means having an orificed end for said shaft, a packing gland in said orifice, and controllable means for providing said member with, and relieving said member of, a power fluid for respectively inflating said member to contract said ring to force said segments to grip said shaft, and deflating said member to expand said ring to release said segments from said grip.

4. A brake for a reciprocable shaft comprising a segmental ring adapted to surround said shaft, with the segments of said ring having clearance therebetween, a flexible hollow ring-like member surrounding said segmental ring about the exterior circumferential face thereof, controllable means for providing said member with, and relieving said member of, a power fluid for respectively inflating said member to contract said ring to force said segments to grip said shaft, and deflating said member to expand said ring to release said segments from said grip, and cushioning means for absorbing axial shocks applied to said segmental ring, including a casing and resilient elements, one at each end of and engaged at its inner end by said casing, said casing providing a backing for said member and engaging the ends of said member and segmental ring, and an outer housing engaging said resilient elements at their outer ends.

JULIUS KINDERVATER.